June 9, 1936.  W. G. SCHALLER  2,043,776
MOLDING AND ELECTRIC OUTLET BOX
Filed Aug. 20, 1934  4 Sheets-Sheet 2
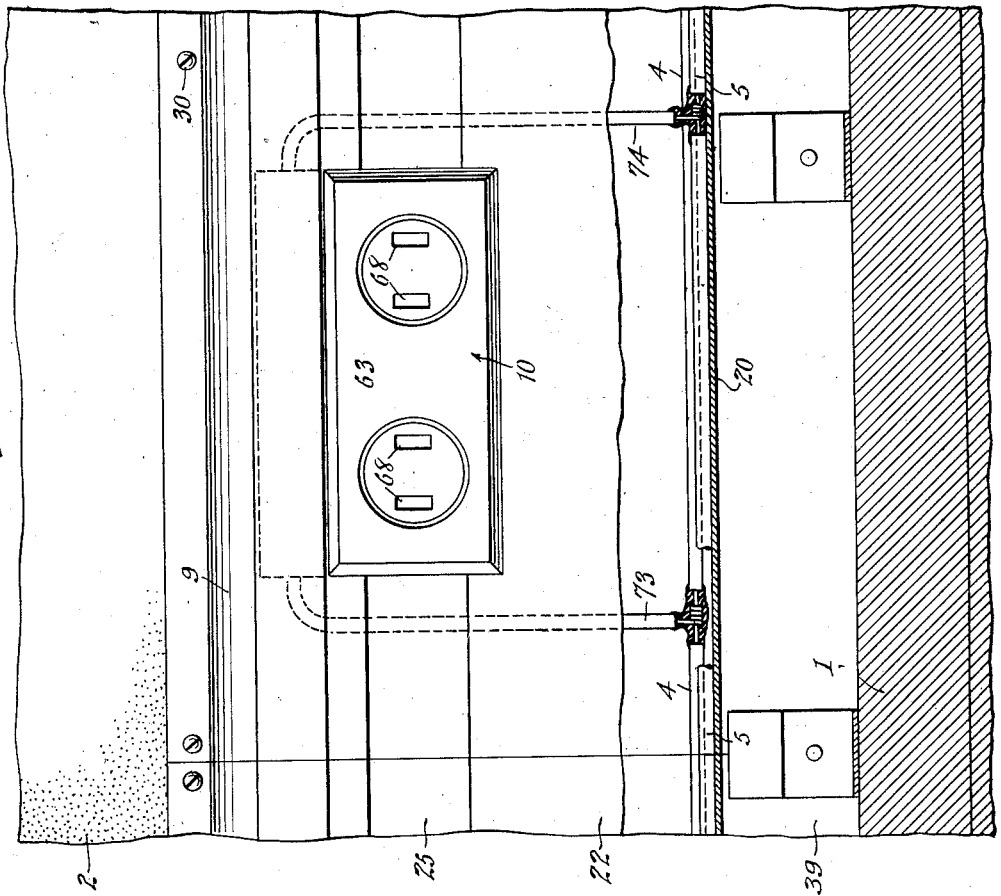
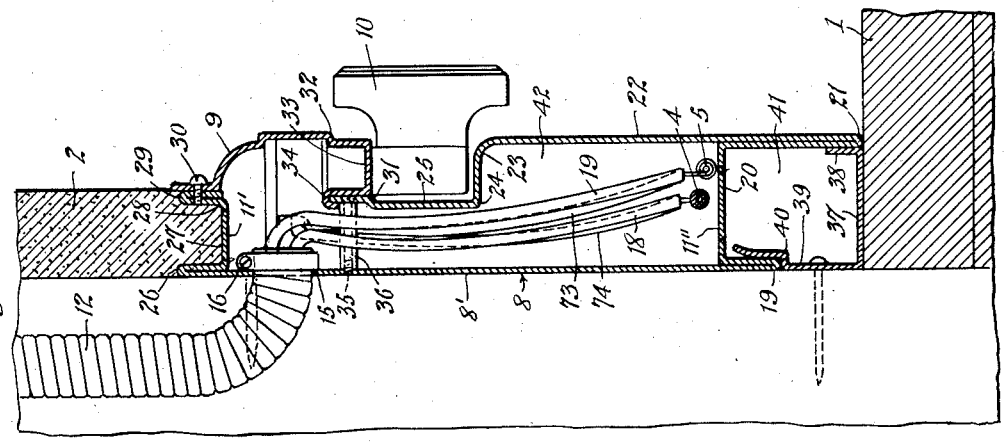
WITNESSES
INVENTOR
Warren G. Schaller
BY
ATTORNEYS June 9, 1936. W. G. SCHALLER 2,043,776
MOLDING AND ELECTRIC OUTLET BOX
Filed Aug. 20, 1934 4 Sheets-Sheet 3
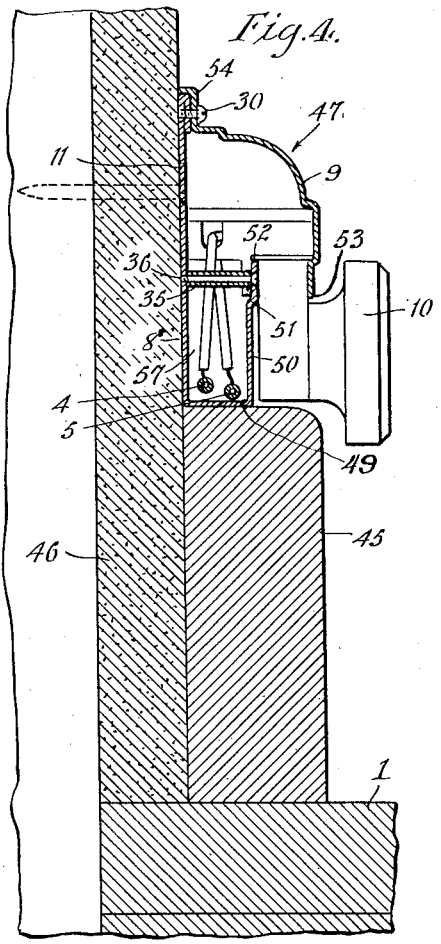
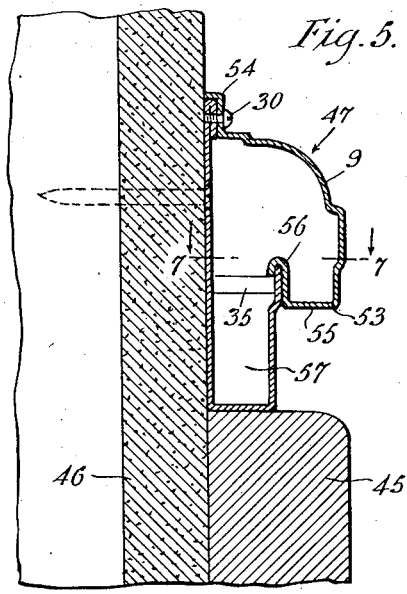
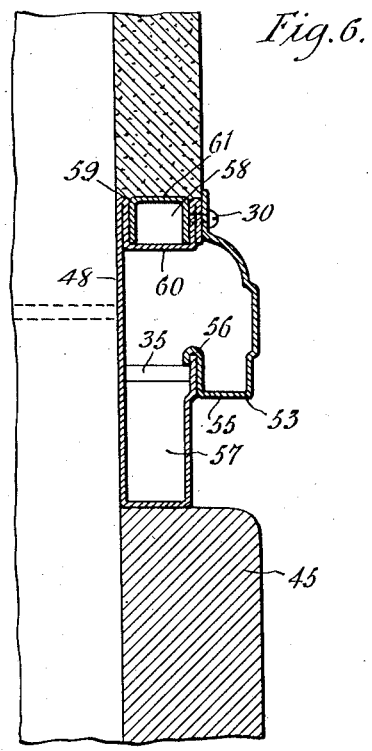
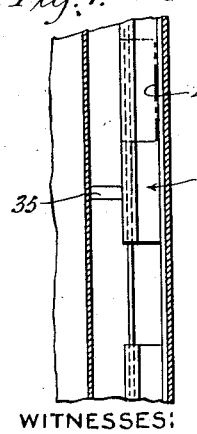
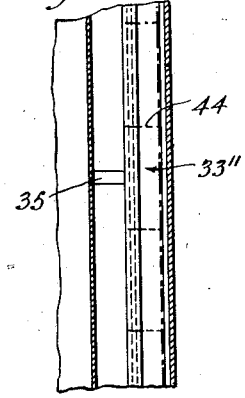
WITNESSES:
Edw. Thorpe
A. L. Kitchin
INVENTOR
Warren G. Schaller
BY
Murray, Anderson & Liddy
ATTORNEYS June 9, 1936.  W. G. SCHALLER  2,043,776
MOLDING AND ELECTRIC OUTLET BOX
Filed Aug. 20, 1934  4 Sheets-Sheet 4
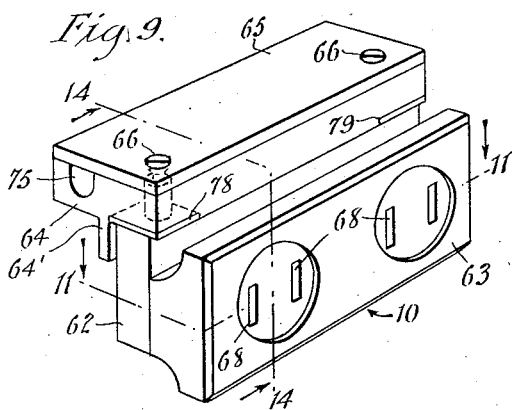
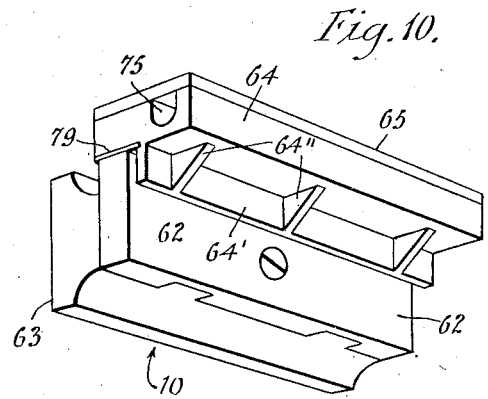
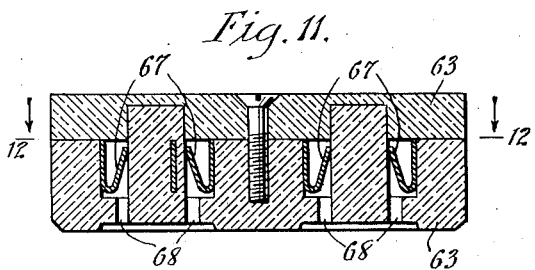
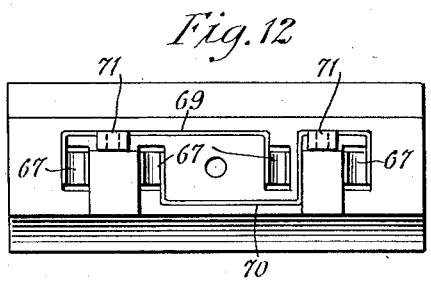
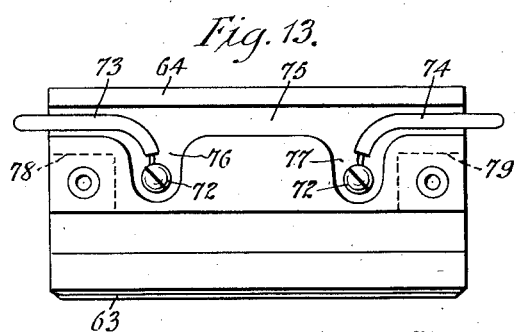
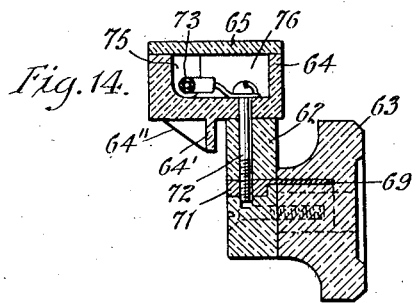
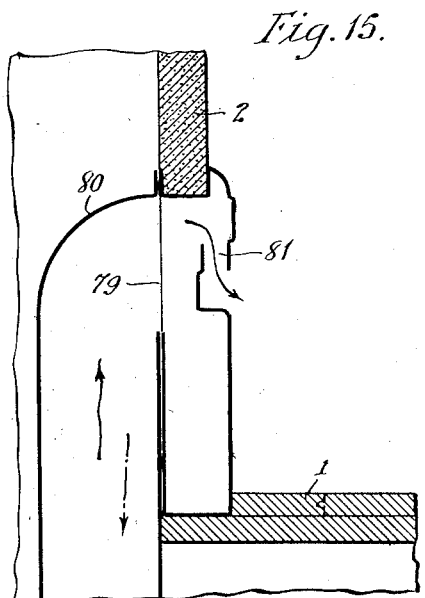
WITNESSES:
Edw. Thorpe
A. L. Kitchin
INVENTOR
Warren G. Schaller
BY
Munn, Anderson & Liddy
ATTORNEYS Patented June 9, 1936

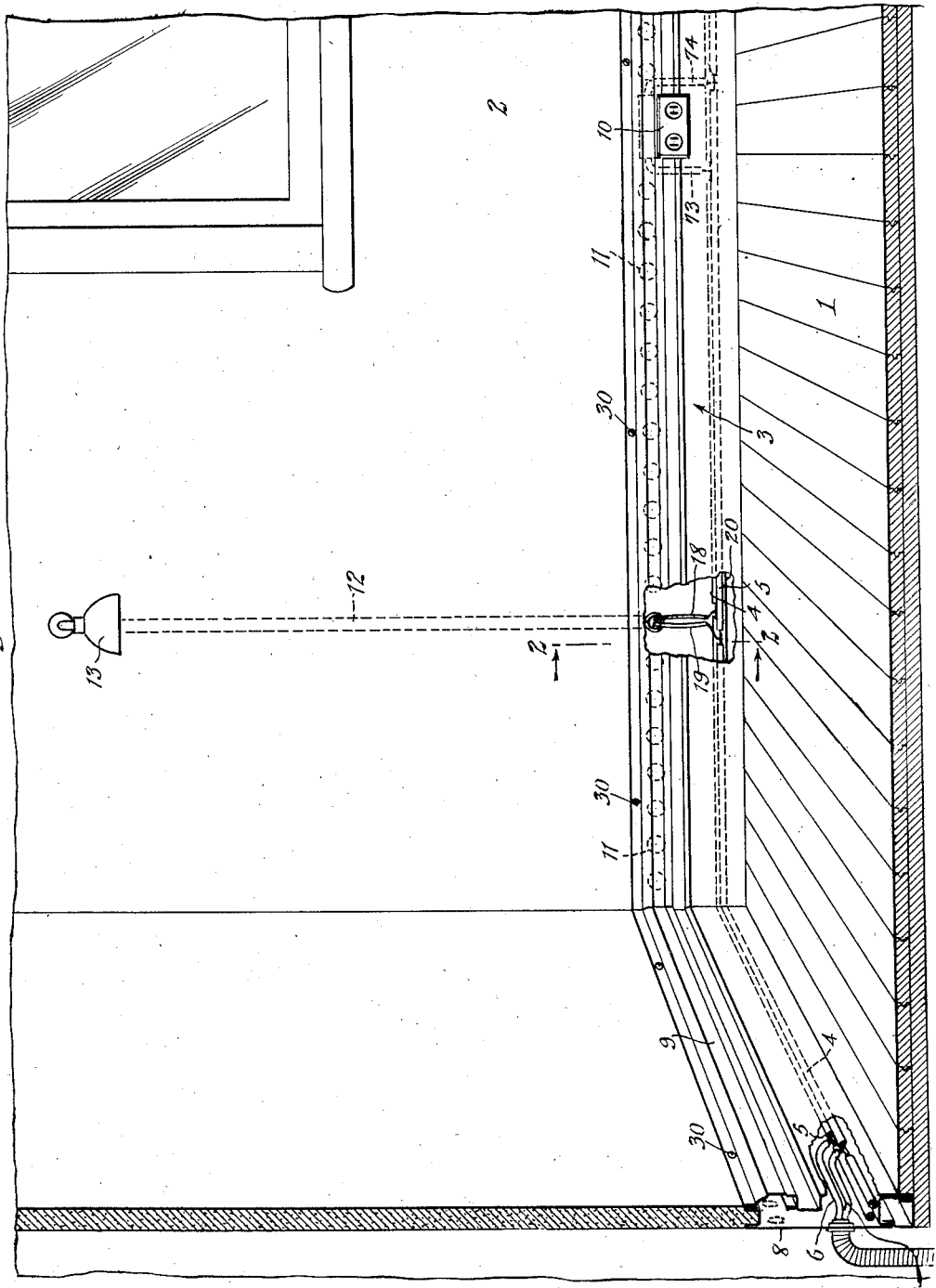

2,043,776

UNITED STATES PATENT OFFICE 2,043,776

MOLDING AND ELECTRIC OUTLET BOX

Warren G. Schaller, Pelham Manor, N. Y.

Application August 20, 1934, Serial No. 740,711

8 Claims. (Cl. 247—3)

This invention relates to moldings and electric outlet boxes, and particularly to an improvement over my co-pending application Serial Number 665,198, an object of the present invention being to provide an improved construction wherein a molding of a desired appearance may be presented and at the same time the conduits in the molding may be tapped at any desired place to provide an outlet box or to permit electrical conduits to be connected.

Another object of the invention is to provide an improved molding structure which may be made to accommodate telephone wires and other conductors accommodating low current, and a chamber or portion for accommodating power wires, with the parts so arranged that the outlet may be easily connected to the power wires at any point along the molding without cutting or in any way injuring the molding.

A further object, more specifically, is to provide an improved molding which is adapted to be placed at one side or entirely around a room, with the parts formed so that the lower part of the molding may accommodate power wires and the upper part is formed to be removed, but when in place presents with the lower part a protecting structure having an opening through which the parts of an outlet box may extend so as to be connected with the power wires within the molding.

An additional object is to provide a molding, outlet or junction box for power wires which may be formed to act as a trimming for the ordinary molding now in common use, with the parts so arranged that a receptacle may be connected therewith at any point along its length.

In the accompanying drawings—

Figure 1 is a view in perspective illustrating part of a room with an embodiment of the invention applied thereto, certain parts being shown in section and other parts broken away for better illustrating the arrangement of certain of the wires;

Figure 2 is a fragmentary sectional view through Figure 1 approximately on the line 2—2, the same being on an enlarged scale;

Figure 3 is an enlarged plan view of the receptacle and surrounding parts as shown in Figure 1;

Figure 4 is a view similar to Figure 2 but showing the modified form wherein the molding is formed as a trimming molding on top of a regular molding now in common use;

Figure 5 is a view similar to Figure 4 but showing how the top or protecting plate is interlocked with the front panel of the main molding structure;

Figure 6 is a view similar to Figure 5 except that it is provided with a formation for receiving telephone and other wires at the top;

Figure 7 is a fragmentary sectional view through Figure 5 approximately on the line 7—7, and illustrating how the knockouts may be positioned;

Figure 8 is a view similar to Figure 7 but showing a slightly modified structure of knockouts;

Figure 9 is a perspective view of the outlet shown in Figure 1;

Figure 10 is a rear perspective view of the outlet shown in Figure 9;

Figure 11 is a horizontal sectional view through Figure 9 approximately on the line 11—11;

Figure 12 is an elevation of the rear part of the structure shown in Figure 11 after the front plate has been removed, the elevation being taken approximately on the line 12—12 of Figure 11;

Figure 13 is a plan view of the structure shown in Figure 1 after the top plate has been removed, the same illustrating how the connecting wires are mounted;

Figure 14 is a sectional view through Figure 9 approximately on the line 14—14;

Figure 15 is a view similar to Figure 2 but showing a modified construction wherein an air conduit is connected to the rear of the molding.

Referring to the accompanying drawings by numeral, 1 indicates the floor of a room, and 2 the side walls. Mounted at the bottom of the side walls is a molding 3 which may extend across one wall only or entirely around the room. This molding is provided with a pair of power wires 4 and 5 which extend the full length of the molding and which receive power from suitable feed wires 6 and 7 extending through a suitable opening in the rear wall of the molding. In forming this molding there is provided what may be termed a body 8 and a cover plate 9. The cover plate 9 is removable so that one or any desired number of outlets 10 may be applied at any point along the molding. The body 8 is also provided with a number of knockouts 11 whereby a BX or other cable may be dropped down from any desired point as, for instance, a lamp 13, and then led into the molding and connected to the power wires 4 and 5 in the usual or conventional manner.

It will be understood that the power wires 4 and 5 are well insulated and that when a receptacle 10 is to be applied or BX cable is used, the insulation is removed from the feed wires at the point of connection and the connection made in the prescribed way. It will also be noted that the BX cable 12 may not only be dropped down from a lamp or wall, but it may be dropped down from the ceiling or extended to any desired point. By providing the knockouts 11 the power wires 4 and 5 may be tapped at any point without in any way injuring the molding and by providing the removable plate 9 an outlet 10 may be applied at any point.

As illustrated in Figure 2 the body 8 of the molding may be provided with any desired knockouts 11 which may be in a single row, or in two or more lines, said knockouts being merely weakened portions which may be easily pressed or forced out by workmen. A BX cable 12 is positioned to extend through the opening 15 from which the knockout has been removed. The usual clamping device 16 is used to hold the end of the BX cable against shifting and the respective wires 17 and 18 are shown extended and connected to the power wires 4 and 5. It will be noted that the body 8 is provided with a back panel 8' which is bent back on itself at 19 and then across to form a dividing plate 20, and then downwardly to the bent portion 21 where it merges into the front panel 22, said front panel being bent at 23 and again at 24 to form an upstanding guiding and supporting rail 25. At the top the wall 8' is bent back upon itself at 26 and then at right angles to protect the transverse bracing plate 27, which in turn is bent at 28 and 29 whereby a double thickness is provided for the various retaining screws 30 which clamp the protecting plate 9 in position. It will be observed that the rail 25 is offset outwardly at 31, and the protecting plate 9 is offset inwardly at 32, so that the parts of the receptacle 10 extending between these offset portions will engage these portions but not rub against the front surface of the rail 25 which is exposed to view. At the lower edge of plate 9 the same is bent to provide a connecting and bracing panel 33, which in turn is bent upwardly to provide a hook 34 which is hooked over the upper edge of the rail 25 and thereby connects the parts together. If desired a bracing sleeve 35 is provided and held in place by a screw 36 whereby the upper end of the rail 25 will be braced. As a matter of fact, there usually will be a large number of these bracing sleeves and screws along the molding. Coacting with the bent lower end of the body 8 is a plate 37 and a bent-up flange 38, and a bent up rear wall 29 offset at 40 to act with the plate 20 and associated parts to form a chamber 41 which is adapted to accommodate telephone wires, bell wires and the like which carry current of low amperage, and plate 20 acts as a bottom for the main chamber 42 and supports the wires 4 and 5.

In my prior application for patent above referred to, the receptacles are adapted to be slid along the molding, but in the present invention they are stationary and may be applied at any point along the molding. To apply an outlet the cover plate 9 is removed and the outlet applied, after which the cover plate 9 is replaced and the parts will then fit as shown in Figure 1. It will be noted that as many outlets as desired may be used.

The bracing panel 33 is preferably made as shown in Figure 7, though it may be made as shown in Figure 8. As illustrated in these figures the respective panels 33' and 33'' are formed with suitable weakened lines 43 and 44, respectively, whereby these panels are formed with spaced knockouts, or completely of knockouts. As shown in Figure 7 the knockouts are spaced apart, while in Figure 8 the weakened lines permit any particular section to be forced out by a blow from a hammer. The knockouts are made of a proper size to receive the outlets or receptacles 10. Preferably one knockout is of the desired width for one outlet or receptacle of the size shown in Figure 1.

With respect to the knockouts just described it will be understood that they are also used with regard to the modified forms shown in Figures 5 and 6. However, in Fig. 4 a first modified structure is shown which is a molding adapted to be mounted on a regular molding 45 now in common use. Molding 45 may be a wood molding or a metal molding, and arranged in front of the plaster 46. Heretofore a bead or trimming was mounted on top of molding 45, but in the present invention this bead or trimming is removed and the molding 47 substituted, which acts in the combined capacity of an outlet box and a molding trimming, but for the purpose of description it will be called a molding. As illustrated in Figure 4 the molding is provided with a back wall 8' fitting flatwise against the plaster 46 and merging into a bottom 49, which in turn merges into an upstanding front wall 50 offset at 51 to present a supporting rail 52. One of the sleeves 35 with its screw 36 is used to brace the rail 52. In this form of the invention the cover pate 9 extends downwardly and stops at the point 53, and at the upper end is provided with a bent trimming section 54 held in place by one of the screws 30. In this form of the invention the same kind of outlet or receptacle, namely, outlet 10 is to be used and may be applied at any point along the molding. The same idea of applying or removing the outlet is carried out, namely, plate 9 is first removed, then the outlet is applied or removed, and the cover plate 9 is replaced. It will be noted that when this action takes place the molding is not cut or injured in any way.

In Figure 5 the same structure is shown as in Figure 4 except the front plate 9 at point 53 merges into a bracing panel 55, which in turn merges into a hook 56 in a similar manner to that shown in Figure 2. It will be understood that the lower portion of the chamber 57 accommodates the wires 4 and 5 in a similar manner to the way chamber 57 in Fig. 4 accommodates the wires 4 and 5.

In Figure 6 a further modified form is shown which is identical to that shown in Figure 5 except that the upper part is formed somewhat different, so that there will be a chamber or passageway 58 for the reception of telephone, bell, or other wires. As shown in this figure the back wall 48 is bent at 59 downwardly and merges into a bottom or bracing plate 60 which is bent upwardly and back upon itself for the reception of the respective screws 30, and also to provide a wall against which the channel member 61 may snugly fit. It is understood that all these members are preferably of metal and therefore protect all the wiring that may be mounted therein.

The receptacle 10 is shown particularly in Fig. 3 and also in Figs. 9 to 14, inclusive. This outlet or receptacle may be molded in either one or any desired number of pieces, and the parts may be assembled to form a finished article when in use. For the purpose of description it may be stated that there is provided a body 62 to which a face plate 63 is connected, and also to which a conduit plate 64 is connected, said conduit plate having a protecting plate 65 held in place by suitable screws 66. The face plate 63 carries the usual and preferred form of contacts 67 correctly positioned in respect to the slots 68, so that a pronged plug may be readily inserted and engaged with the contacts 67. Space for two plugs has been disclosed but it will be evident that the outlet could be provided for one plug or more than two without departing from the spirit of the invention. Where there is space for two plugs, conductors 69 and 70 are provided, conductor 69 being electrically connected with all the positive contacts 67, and conductor 70 connected with all the negative contacts 67. A threaded lug or enlargement 71 is formed on each of the plates 69 and 70, said enlargement accommodating the respective screws 72 which extend upwardly as shown in Fig. 14, and into this conduit plate 64. That part of the conductors 69 and 70 carrying the enlargement 71 extends from the face plate into the body 62 so as to readily coact with the screws 72. These screws act in the double capacity of connecting the respective wires 73 and 74 with the screws 72 and clamping the conduit plate 64 in place. Conduit plate 64 is provided with a passageway 75 which extends from one end to the other and merges into notches 76 and 77. Wires 73 and 74 are merely short connecting wires and are dropped down to the power wires 4 and 5, as shown in Fig. 3, where they are connected to these power wires in the conventional way. This will permit the parts to be easily connected up and will permit the power wires to normally rest on the bottom of the molding. It will be understood that when a new or additional outlet is to be applied, the protecting plate 9 is removed and one or more of the knockouts 33' are removed. Wires 73 and 74 are then connected up as shown in Fig. 3, and the outlet or receptacle 10 is positioned on the rail 25. The cover plate 9 is then reapplied and the job of adding an additional outlet is completed.

Where a BX cable is to be connected up to the power wires 4 and 5, as shown in Fig. 1, a suitable opening is made in wall 2 and the cable is inserted and dropped down to the molding. One of the knockouts 11 is then removed and the cable pulled through this opening thus provided. Clamps 16 are then applied and the wires in the cable connected up in a desired manner to the power wires 4 and 5. After this has been done the fixture or lamp 13 is connected up in the usual way and the device tested, after which the cover plate 9 is reapplied.

In forming the knockouts 11 the same may be located near the bottom of the rear wall but preferably most are made near the top so that they may be more readily reached after the cover plate 9 has been removed. It will be noted that the general shape of the outlet or receptacle 10 in cross section is almost Z-shaped wherein the conduit plate is adapted to be positioned above the rail 25 and body 62 parallel thereto, and face plate 63 positioned to extend at right angles thereto. In order to brace and prevent undesirable wabbling the conduit plate 64 is provided with depending webs 64' having one or more braces 64", as shown in Fig. 10. Also, to take care of the weight or any possible friction when applying the device, there are provided metal friction plates 78 and 79, as shown in Fig. 9.

Under some circumstances it may be desired to use the molding in connection with an air conditioning system, and when this is the case a large opening 79 is provided as shown in Fig. 15. Discharging into this opening is a pipe 80 which may supply air or may be connected to a suction pump to draw out air. It will be noted that air will freely circulate through passageway 81 so that in an air conditioning system the air may be caused to pass in either direction through the molding. In this form of the invention the bracing panels 33' and 34' are not used but the same structure is shown in Fig. 4 which may be formed as a trimming for molding 45, or may be formed full size as shown in Fig. 2.

In forming the body 8 as shown in Fig. 2 the knockouts 11 may be near the top in the rear wall 8', or if desired may be in the top as indicated at 11', or in the bottom as indicated at 11". With these knockouts the molding is a continuous metallic enclosure for electrical conductors and access to the conductors may be readily secured through any of the knockouts. In addition, chamber 41 may be a complete metallic enclosed chamber, or if preferred the members 39 may be merely connecting clips, as shown in Fig. 3, to connect two sections of the molding. This provides something in the nature of a desirable form of mechanical connection and also a good electrical connection or grounding of one part of the molding to the other. As illustrated particularly in Fig. 3 the members 39 are merely short sections or clips spaced apart. This form is desirable where the molding is used against a fireproof wall, but if the wall should be made from wood or other inflammable material, then the clips 39 would be continuous so that the chamber 41 would be enclosed by metal throughout.

From Fig. 1 it will be observed that the supply wires 6 and 7 are connected at some point intermediate the ends of the wires 4 and 5 when these wires are straight or form less than a loop or enclosure. In some cases the molding extends entirely around the room except at the door openings, and when this is the case the wires 4 and 5 form a complete loop, part of the wires opposite the door openings being carried either over or under the doors. In this way the current will be distributed over wires 4 and 5 so that there is less likelihood of an overload. The same general idea is true where the wires form less than a loop, as the supply feed wires 6 and 7 are connected half between the ends of wires 4 and 5 and thus reduce the chances of an overload.

I claim:—

1. A molding comprising a molding structure having a body with a top portion, a rear wall extending at right angles to the top portion, a bottom wall and a front panel extending parallel to the rear wall but falling short of the top portion, and a cover plate connected to the top portion and overlapping the front panel, said cover plate being spaced forwardly of the front panel and provided with an inturned bracing panel having a portion hooked over said front panel and knockouts, whereby an outlet member may extend through said bracing panel after one of said knockouts has been removed.

2. A molding and electric outlet box comprising a hollow molding structure having a front wall and a cover plate overlapping but spaced from said front wall whereby a longitudinally extending slot is provided, an outlet mounted in said slot, said cover plate being removable and positioned so that said overlapping part will be vertical when the molding structure is vertical, said plate having an inturned bracing panel extending in a horizontal direction provided with an opening for accommodating said outlet, said bracing panel having a hook adapted to fit over the front wall of said molding structure.

3. In a building a molding adapted to be placed around the walls thereof, said molding being hollow and forming a continuous passageway around the walls of the building, said molding having a front panel and a cover plate for the upper part of the front panel, said front panel having a portion near the top offset inwardly so that the offset portion will be in back of but spaced from the lower part of said cover plate, said cover plate having an integral flange provided with an upstanding section fitting flatwise against said offset portion, said upstanding section being formed with a hooked portion fitting over the upper edge of said offset portion, said inturned panel being formed with a plurality of knockouts, whereby outlets may be positioned to extend through said panel, said molding structure being adapted to carry a pair of power wires, any of said knockout portions being adapted to be removed for the insertion of an outlet.

4. A hollow molding comprising a body having a rear wall and a front panel of less height than the rear wall, said rear wall having a plurality of knockouts whereby wires may be extended therethrough, and a cover plate coacting with said front wall, said cover plate having a portion overlapping the upper part of said front wall sufficiently to prevent the hand of a person being inserted into the molding, said cover plate being spaced forwardly from said front panel sufficiently to permit an outlet to extend between the cover plate and the front panel, and a rearwardly extending part provided with a hook fitted over said front wall, said rearwardly extending part having a plurality of knockout portions adapted to be removed when an outlet is to be applied.

5. A molding for acting as an electric outlet and adapted to receive one or more outlets, comprising a back wall merging into a right angled section forming a bottom, said right angled section merging into a front wall parallel to the back and falling short of the top of the back, said back having knockout portions for the reception of wires from the back, said bottom and the walls adjacent thereto forming a chamber for the reception of a pair of power wires, and a cover plate secured to the top of said back and overlapping said front wall, said cover plate being spaced from said front wall thereby providing an opening therebetween through which part of an outlet may extend, said cover plate having a rearwardly extending member at its lower edge, said rearwardly extending member being formed at its rear edge with a hook fitting over the upper edge of said front wall for bracing the parts connected.

6. A molding of the character described, including a body having a front wall and a rear wall spaced apart and connected by a bottom, said front wall being of less height than the rear wall, a plurality of braces connecting the upper part of the front wall and the rear wall, and a cover plate connected to the rear wall at the upper edge formed to overlap the front wall, the overlapping part being spaced from the front wall, and means for connecting the overlapping part with the front wall, said means having knockout portions whereby an outlet may be positioned with part extending between the cover plate and the front wall.

7. A molding and electric box outlet, comprising a molding structure formed with a hollow body and a removable cover plate having a front face and a right-angled extension at its lower edge formed with knockout portions, said body having knockout portions at the back, and a receptacle fitting between the removable cover plate and said body and extending through the space left by one of said knockout portions after the same has been removed.

8. A metallic molding and an electric box outlet, comprising a molding structure formed with a body having knockout portions at the back and a front wall section of less width than the back, a removable cover plate coacting with said front wall section to complete the front wall of said body, and a receptacle fitting between the removable cover plate and said front wall structure so that part of the receptacle will be within said body and part will project therefrom, said cover plate having the upper part spaced outwardly of said front wall section and the lower part formed with an inturned spacing and bracing panel merging into a hooked edge fitting over the upper edge portion of said front wall section for bracing the front wall section, said inturned panel being formed with a plurality of knockouts whereby said receptacle may be fitted between the removable cover plate and said front wall at various places along said inturned panel, and means at the upper edge of said cover plate for removably securing the cover plate in position.

WARREN G. SCHALLER.